(12) United States Patent
Chao et al.

(10) Patent No.: US 7,911,700 B2
(45) Date of Patent: Mar. 22, 2011

(54) LIGHT GUIDING FILM

(75) Inventors: Chih-Chiang Chao, Taipei (TW);
Po-Ling Shiao, Hsinchu (TW); Yu-Tsan Tseng, Taoyuan County (TW);
Mei-Chun Lai, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 599 days.

(21) Appl. No.: 11/950,344

(22) Filed: Dec. 4, 2007

(65) Prior Publication Data
US 2009/0091837 A1    Apr. 9, 2009

(30) Foreign Application Priority Data
Oct. 4, 2007   (TW) .............................. 96137232 A

(51) Int. Cl.
*G02B 5/02*   (2006.01)
*G02B 13/20*  (2006.01)

(52) U.S. Cl. ....................................... 359/599
(58) Field of Classification Search ................... 359/599
See application file for complete search history.

(56) References Cited

U.S. PATENT DOCUMENTS

| | | | |
|---|---|---|---|
| 5,119,235 A * | 6/1992 | Umeda et al. | |
| 5,177,637 A | 1/1993 | Tsukada | |
| 5,300,263 A | 4/1994 | Hoopman et al. | |
| 5,584,556 A | 12/1996 | Yokoyama et al. | |
| 5,712,694 A * | 1/1998 | Taira et al. | |
| 5,861,990 A * | 1/1999 | Tedesco | |
| 5,883,684 A * | 3/1999 | Millikan et al. | |
| 5,933,276 A | 8/1999 | Magee | |
| 5,995,288 A | 11/1999 | Kashima et al. | |
| 6,033,094 A * | 3/2000 | Sohn | |
| 6,163,405 A | 12/2000 | Chang et al. | |
| 6,250,777 B1 | 6/2001 | Aoyama | |
| 6,259,854 B1 * | 7/2001 | Shinji et al. | |
| 6,445,504 B1 | 9/2002 | Suga et al. | |
| 6,486,931 B1 | 11/2002 | Ueda | |
| 6,628,355 B1 * | 9/2003 | Takahara | |
| 6,913,365 B2 | 7/2005 | Masaki et al. | |
| 6,974,241 B2 * | 12/2005 | Hara et al. | |
| 7,489,373 B2 | 2/2009 | Kim | |
| 7,656,584 B2 * | 2/2010 | Chao et al. | |
| 7,789,548 B2 * | 9/2010 | Chao et al. | |
| 2003/0058553 A1 | 3/2003 | Epstein et al. | |
| 2004/0061440 A1 * | 4/2004 | Inaum et al. | |

(Continued)

FOREIGN PATENT DOCUMENTS

CN   1641432 A   7/2005

(Continued)

OTHER PUBLICATIONS

Samuli Siitonen et al. "White LED Light Coupling Into Light Guides With Diffraction Gratings", Applied Optics, Apr. 20, 2006, p. 2623-2630, vol. 45, No. 12, US.*

(Continued)

*Primary Examiner* — Joshua L Pritchett

(57) ABSTRACT

A light guiding film is provided including a main body, and a light diffusion structure comprising a plurality of micro concave lenses arranged in a first direction and a second direction to form a second dimensional array and the curvature of each concave lens and the junction of the concave lenses are different from zero. Light from a light source passes through the light diffusion structure and is refracted into the main body and then propagates in the main body by total reflection.

17 Claims, 13 Drawing Sheets

U.S. PATENT DOCUMENTS

| | | | |
|---|---|---|---|
| 2004/0061944 A1 | | 4/2004 | Kashima et al. |
| 2004/0136174 A1* | | 7/2004 | Yu et al. |
| 2004/0202441 A1* | | 10/2004 | Greiner |
| 2005/0007793 A1 | | 1/2005 | Yoshida et al. |
| 2005/0141212 A1* | | 6/2005 | Moon et al. ............... 362/29 |
| 2005/0259939 A1* | | 11/2005 | Rinko |
| 2006/0250707 A1 | | 11/2006 | Whitney et al. |
| 2006/0256582 A1 | | 11/2006 | Chuang |
| 2006/0262564 A1* | | 11/2006 | Baba |
| 2007/0002205 A1* | | 1/2007 | Hasei |
| 2007/0289119 A1* | | 12/2007 | Lee et al. ............... 29/592.1 |
| 2008/0037947 A1* | | 2/2008 | Chao et al. |
| 2008/0304164 A1 | | 12/2008 | Chao et al. |
| 2010/0264555 A1* | | 10/2010 | Chao et al. |

FOREIGN PATENT DOCUMENTS

| | | | |
|---|---|---|---|
| CN | 1727952 | | 2/2006 |
| CN | 1760724 A | | 4/2006 |
| JP | 6-43310 | | 2/1994 |
| JP | 06-265732 | | 9/1994 |
| JP | 2000-48613 | | 2/2000 |
| JP | 2000-249837 | * | 9/2000 |
| JP | 2003500706 A | * | 1/2003 |
| JP | 2004126016 A | | 4/2004 |
| JP | 2005114873 A | * | 4/2005 |
| JP | 2006-47608 | | 2/2006 |
| JP | 2006-154252 | | 6/2006 |
| JP | 2007-206674 | | 8/2007 |
| TW | 252344 B | | 4/2006 |
| TW | 200613844 | | 5/2006 |
| WO | WO 02/08806 A2 | | 1/2002 |

OTHER PUBLICATIONS

Samuli Siitonen et al. "A Double-Sided Grating Coupler for Thin Light Guides", Optics Express, Mar. 5, 2007, p. 2008-2018, vol. 15, No. 5, US.*

"Design and fabrication of binary slanted surface-relief gratings for a planar optical interconnection," by Miller et al, Applied Optics, vol. 36, No. 23, Aug. 10, 1997, pp. 5717-5727, US.*

"Optimization of anisotropically etched silicon surface-relief gratings for substrate-mode optical interconnects," by Wu et al Applied Optics, vol. 45, No. 1, Jan. 1, 2006, pp. 15-21,US.*

"Continuous surface relief micro-optical elements fabricated on photographic emulsions by use of binary and halftone masks," by Navarrete-Garcia et al, Optical Materials, vol. 23, 2003, pp. 501-512,US.*

Yourii et al. "High-efficiency Slim LED Backlight System with Mixing Light Guide". SID 03 Digest, pp. 1259-1261, vol. 43.3, US.

Samuli et al. "White LED light coupling into light guides with diffraction gratings". Applied Optics, Apr. 20, 2006, pp. 2623-2630, vol. 45, No. 2, US.

Samuli et al. "A double-sided grating coupler for thin light guides". Optics Express, Mar. 5, 2007, pp. 2008-2018, Bol. 15, No. 5, US.

China Patent Office, Office Action, Patent Application No. 200710165935.5, Nov. 9, 2010, China.

* cited by examiner

US 7,911,700 B2

LIGHT GUIDING FILM

BACKGROUND OF THE INVENTION

1. Field of the Invention

The invention relates to a light guiding film, and in particular relates to a light guiding film allowing light to enter and propagate therein.

2. Description of the Related Art

Mobile devices, such as mobile phones, PDAs, or digital cameras, have a side backlight module. Meanwhile, as smaller sizes are preferred, an extra-thin light guiding film is desired. When the light guiding film has a thickness less than 500 μm, it is difficult to direct light into the film from edges thereof. When the light source is a light emitting device (LED), light beams from the LED converge, and, therefore, can be directed into a thinner film than a cold cathode fluorescent lamp (CCFL) can. When the film is too thin, even light beams from LEDs cannot be directed into the film from edges thereof. A complicated method and system must be employed to couple light beams to the film.

A typical light guide film is provided in U.S. Pat. No. 6,259,854. Light beams are directed from edges of a thick light guide film and propagate by continuous total reflection therein. Light beams exits the light guiding film from a surface with a printed dot or micro optical structure. SID'03 DIGEST, 2003, p 1259-1261 discloses a light guiding film. Light beams are directed into the light guiding film from the back and then are reflected. The disclosed structure is complicated and reduces energy of light beams. US patent publication No. 2006/0262564 discloses an optical cap which has a crowned shape. Light beam from an LED is refracted into the light guiding film and propagates therein. The light beams are reflected and then exited from the film. Such a structure cannot have a small thickness and may increase costs. U.S. Pat. No. 5,883,684 discloses a side backlight module having a reflective layer reflecting light beams into a film. Here, light beams lose large amounts energy during refraction and reflection. US patent publication No. 2005/0259939 discloses a bended light guiding film, and light beams enter the film from the edge. US patent publication No. 2004/061440 discloses a thin light guiding film. Light beams are parallel to the film but do not propagate in the film. Japan patent publication No. 2000249837 discloses light beams being directed into a thin film by taper method. Such a method can reduce light intensity and requires longer optical couple distance. US patent publication No. 2004/202441 discloses a light guiding film with a notch corresponding to a light source. Light beams are directed into the film from edges. Applied Optics April 2006_Vol. 45 No. 12 and Optics Express 2008 March 2007/ Vol. 15 No. 5 discloses grating diffracts light beams to propagate parallel to the film and couple the light beams to the film.

BRIEF SUMMARY OF INVENTION

An embodiment of a light guiding film of the invention comprises a main body, and a light diffusion structure comprising a plurality of micro concave lenses arranged in a first direction and a second direction to form a second dimensional array, wherein the curvature of each concave lens and the junction of the concave lenses are different from zero. Light from a light source passes through the light diffusion structure, is refracted into the main body and then propagates in the main body by total reflection.

The light guiding film further comprises a reflective element adjacent to the main body, wherein the light is reflected by the reflective element to pass through the light diffusion structure, is refracted into the main body and propagates in the main body by total reflection.

The main body has a first surface on which the light diffusion structure is formed and a second surface. When the light passes through the first surface to enter the light diffusion structure, the reflective element is adjacent to the second surface. When the light passes through the second surface to enter the light diffusion structure, the reflective element is adjacent to the light diffusion structure.

In another embodiment, the main body has a first surface on which the light diffusion structure is formed and a second surface. The light passes through the first surface to enter the light diffusion structure and propagates in the main body by total reflection.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein:

FIGS. 6 and 7 depicts the light diffusion and total reflection of the invention, wherein FIG. 6 shows sphere lens embodiment, and FIG. 7 shows non-sphere lens embodiment;

DETAILED DESCRIPTION OF INVENTION

Figure 1:
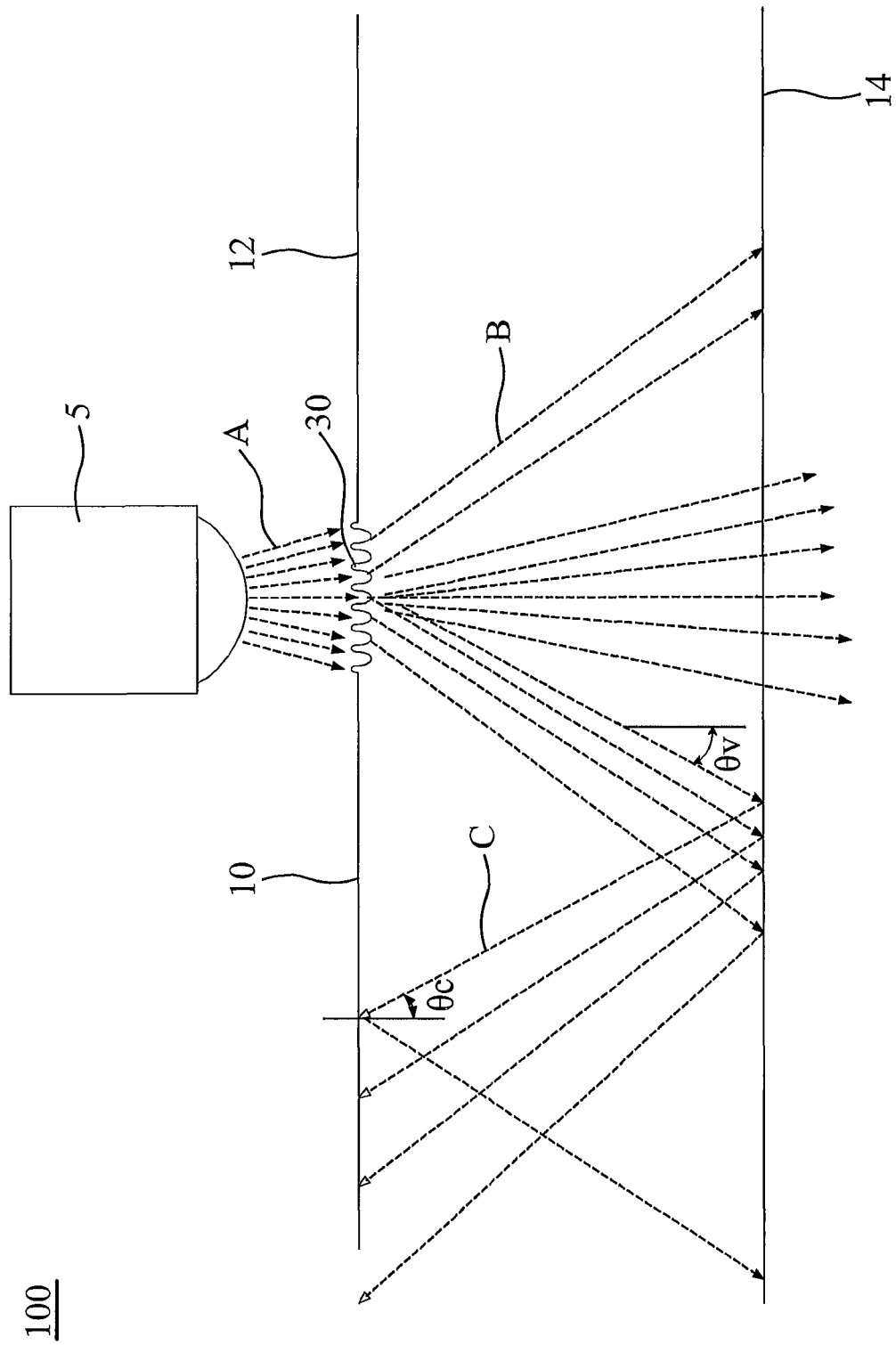
FIG. 1 is a schematic view of an embodiment of a light guiding film of the invention.

Referring to FIG. 1, a light guiding film 100 comprises a main body 10 having a first surface 12 and a second surface 14. A light diffusion structure 30 is formed on the first surface 12. When Light A from a light source 5 reaches the light diffusion structure 30, Light A is diffused. The diffused light B is reflected by the second surface 14. The reflected light C reaches the interface of the film and air and is reflected by the interface. As the light reaching the interface has an incident angle greater than the critical angle θc of total reflection, total reflection occurs on the interface, whereby the light C propagates in the main body 10 by continuous total reflection. Thus, light can be directed into the light guiding film 100 from one surface of the light guiding film 100. The propagation direction of light is substantially perpendicular to the incident direction of light.

Figure 2:
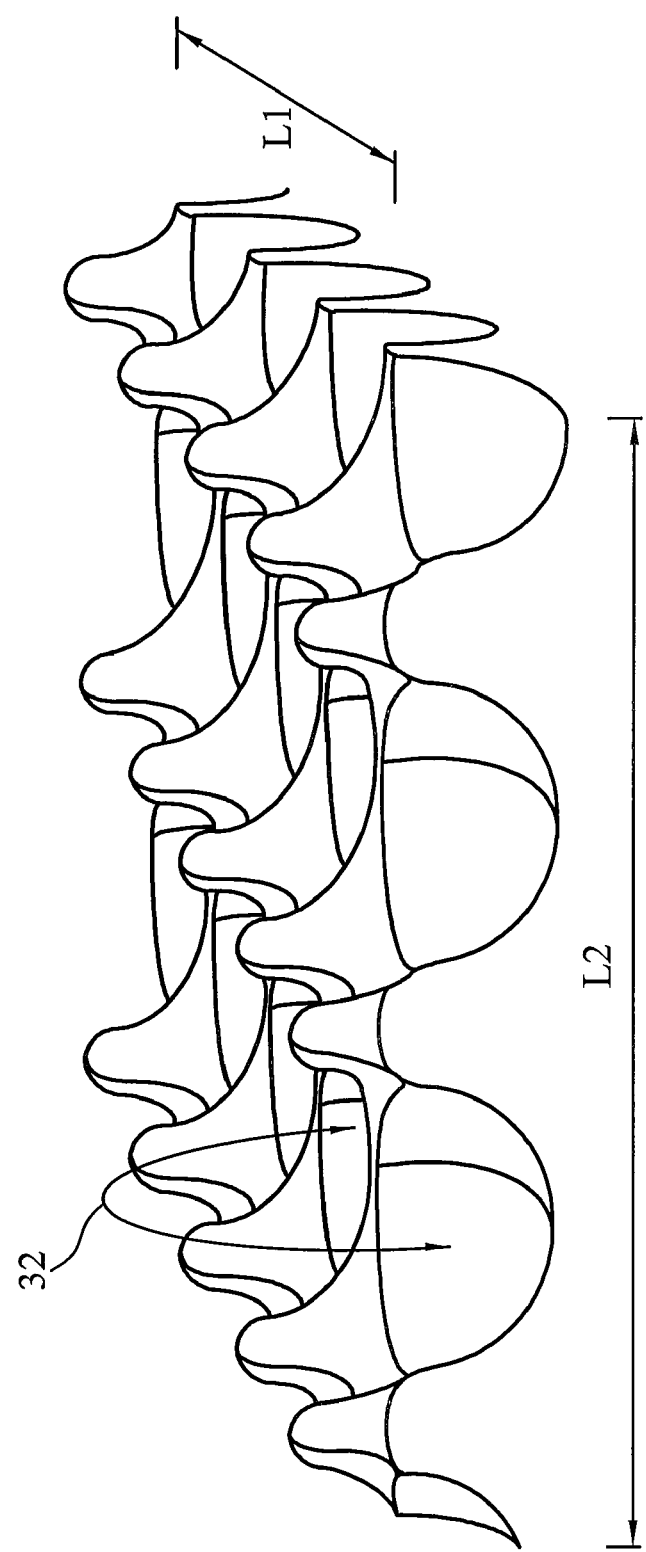
FIG. 2 is a schematic view of a light diffusion structure of the light guiding film of the invention.

The light diffusion structure 30 comprises a plurality of micro concave lenses 32 arranged along a first direction L1 and a second direction L2 to form a two dimensional array, as shown in FIG. 2. The structure can be made by laser dragging method. The curvatures on each concave lens 32 and the junction of the concave lenses 32 are different from zero.

The critical angle θc depends on the material of the light guiding film 100. In general, the light guiding film 100 is made of polycarbonate. The index of refraction of polycarbonate is n1=1.59, the index of refraction of air is n2=1. As θc=arc sin (n2/n1), θc of polycarbonate is 38.97°.

Figure 3:
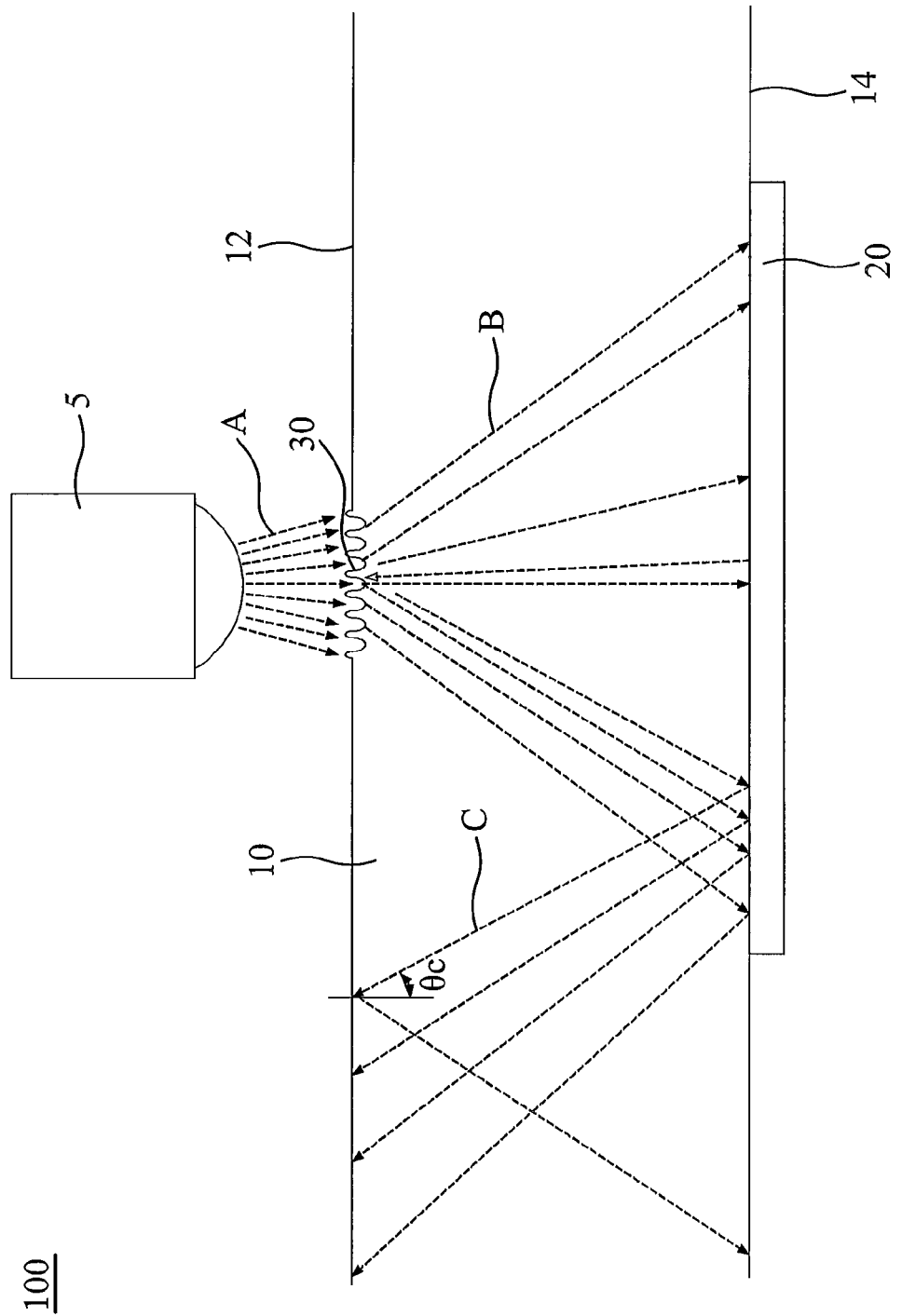
FIG. 3 is a schematic view of another embodiment of a light guiding film of the invention.

FIG. 3 depicts another embodiment of the light guiding film of the invention. In this embodiment, a reflective element 20 is disposed on the second surface 14. The reflective element 20 reflects light reaching the second surface 14. The reflected light is totally reflected by the first surface 12 and propagates in the main body 10 by continuous total reflection.

Figure 4:
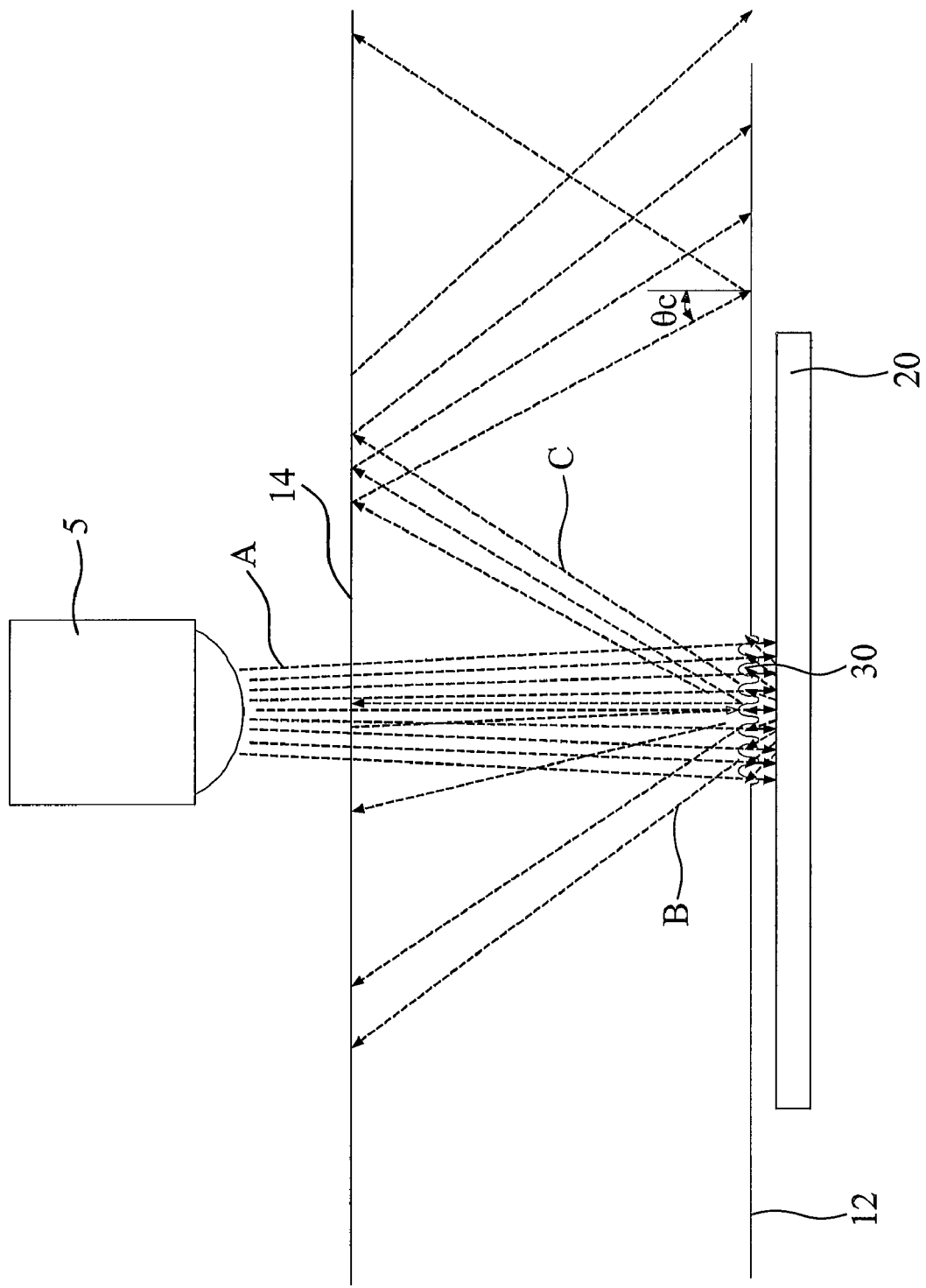
FIG. 4 is a schematic view of another embodiment of a light guiding film of the invention.

FIG. 4 depicts another embodiment of the light guiding film of the invention. The reflective element 20 faces the light diffusion structure 30 on the first surface 12. In this embodiment, light A from the light source 5 enters the main body 10 via the light diffusion structure 30 and is reflected by the reflective element 20. The reflected light B passes through the light diffusion structure 30 again to be diffused. When the diffused light C reaches the interface of the light guiding film 100 and air, continuous total reflection occurs. The light propagates in the main body 10 by continuous total reflection.

Figure 5:
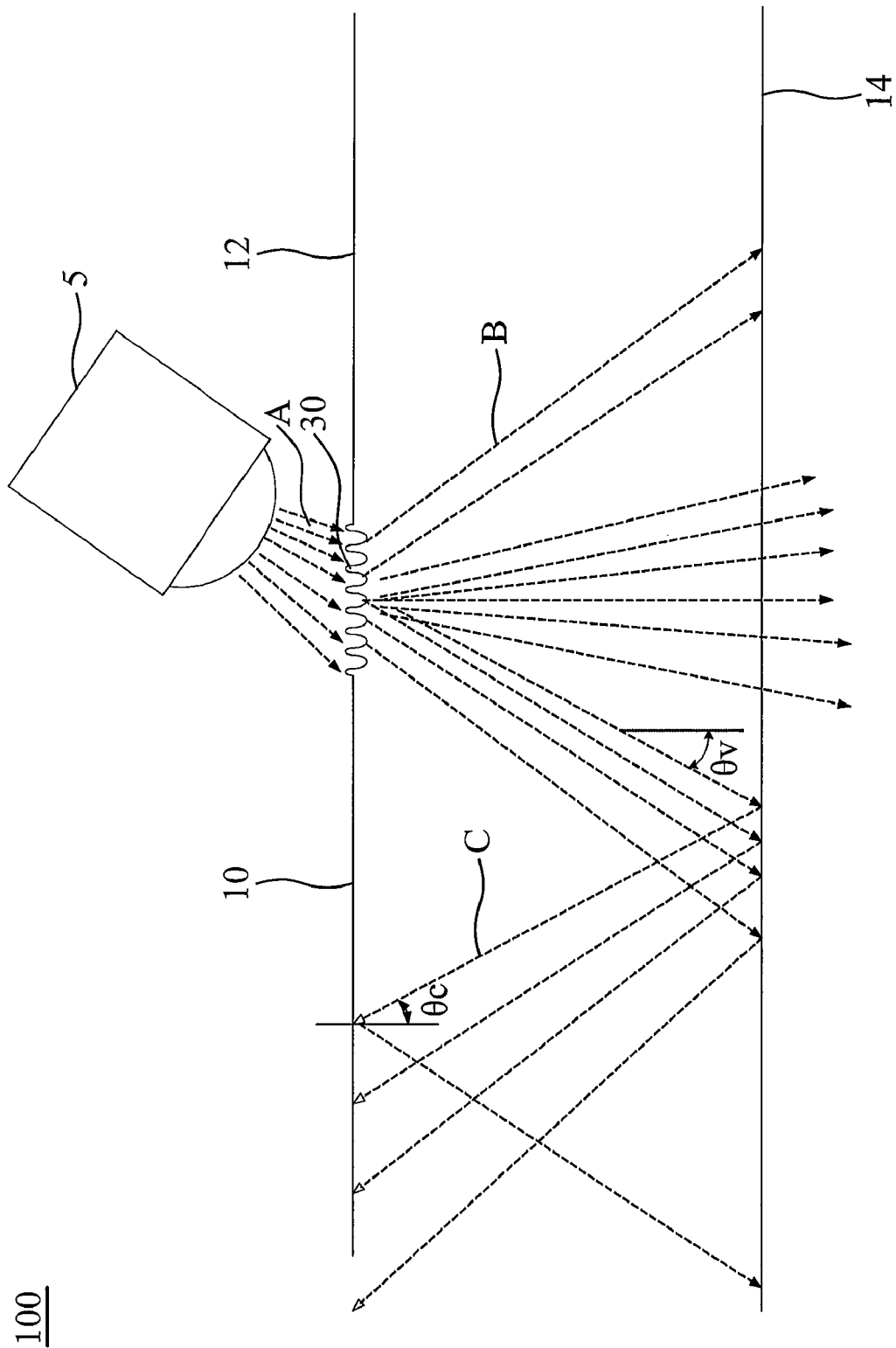
FIG. 5 is a schematic view of another embodiment of a light guiding film of the invention.

FIG. 5 depicts another arrangement of the light guiding film and the light source according to the invention. The light source 5 is inclined to the first surface 12. In such an arrangement, light intensity is not uniformly distributed.

The light diffusion and total reflection in the light guiding film is described as follows. The critical angle of total reflection for the polycarbonate and air is 38.97°.

Figure 6:
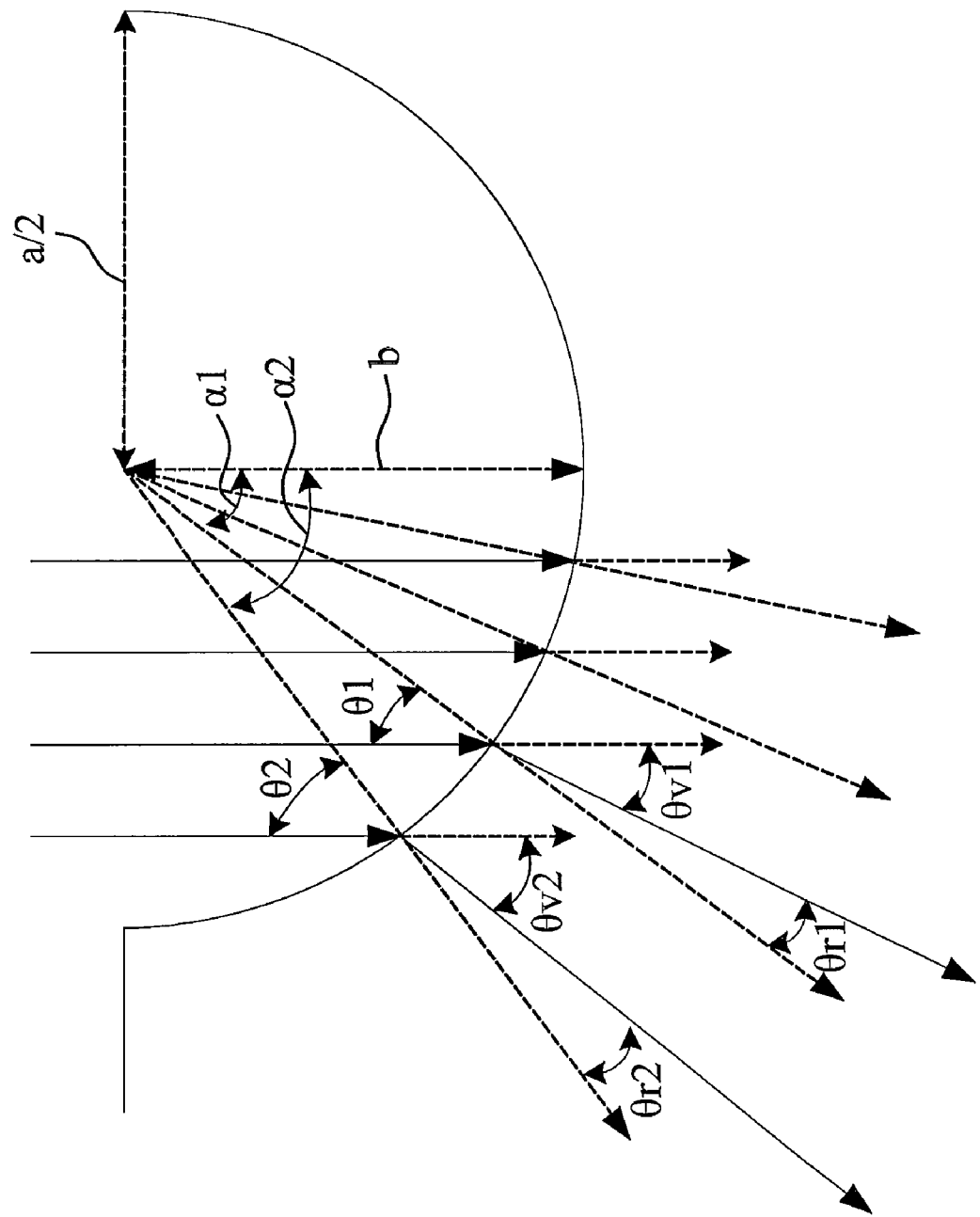

FIG. 6 depicts the micro concave lens being a semi-sphere lens. θ1 and θ2 are incident angle of light beams 1 and 2. θr1 and θr2 are refraction angle of light beams 1 and 2. α1 and α2 are the central angles of the light beams 1 and 2. θv1 and θv2 are view angle of the refracted light beams 1 and 2. As the micro concave lens is a semi-sphere lens, the normal line passes through the center of the sphere (focus). According to the Snell's law, n2 sin θ1=n2 sin θr1, α1=θ1, θv1=α1−θr1. When θ1 is 36.8°, θr1 is 22.1°, and θv1=45°−26.4°=14.7°<38.97° (critical angle of total reflection), no light is totally reflected. When θ2 is 52.9°, θr2=30.1°, and θv2=22.8°<38.97°. The light cannot be totally reflected. Theoretically, total reflection occurs only when the incident angle exceeds 77°. However, minimal amount of light exceeds the angle. The sphere lens has poor efficiency in directing light.

Figure 7:
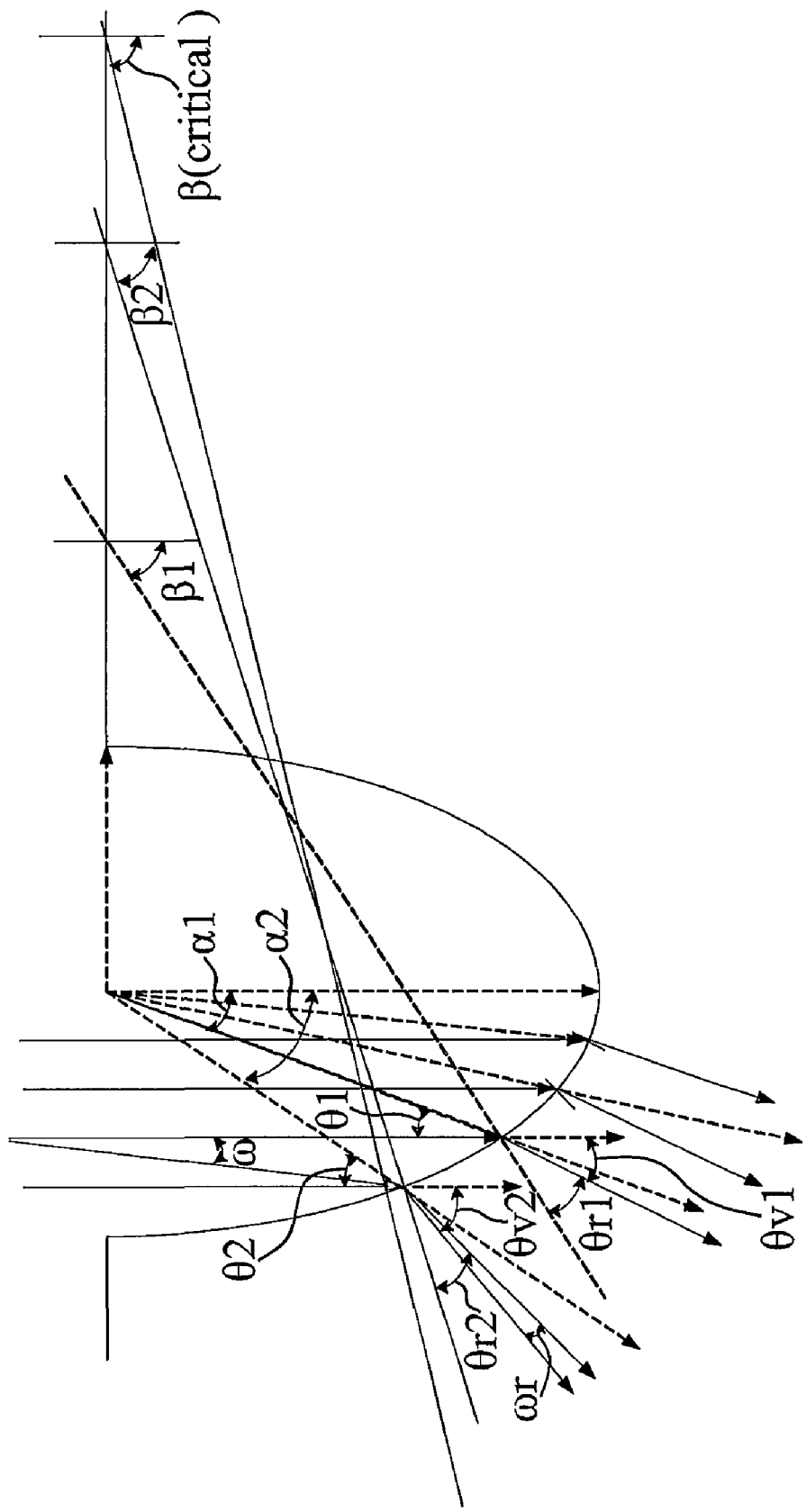

FIG. 7 depicts a non-sphere lens (elliptic lens, paraboloid lens or hyperboloid lens). β1 and β2 are incident angles of the light beams 1 and 2. The depth of an elliptic lens is b, and the radius of the elliptic lens is a/2. The eccentric ratio e=(1−(a/2)²/b²)½. When a:b=1:1, e=0.86. β1>θ1 for the elliptic lens. β1=56.3°, β2=72.4°. According to Snell's law, sin β1=1.59 sin θr1, θv1=β1−θr1=24.7°, θv2=β2−θr2=35.5°, which is very close to the critical angle 38.97°. If θv3 is 38.97°, β is about 77°. Light is totally reflected by a elliptic lens with high eccentric ratio.

When the light entering the lens is deflected by an angle, for example ω=12°, β2 is reduced from 72.4° to 60.4°. By calculation, θr1=33.1°, θv1=β1−θr1=39.3°, which exceeds the critical angle. High efficiency is obtained only when the ratio a/b exceeds 2.

Figure 8:
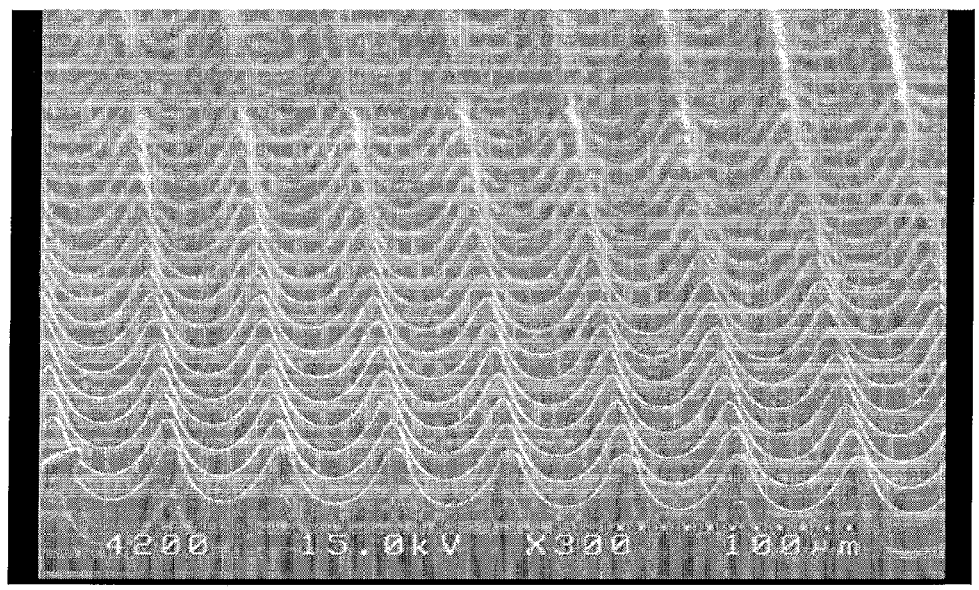
FIG. 8 is an SEM diagram of the micro concave lens array of the invention.
Figure 9:
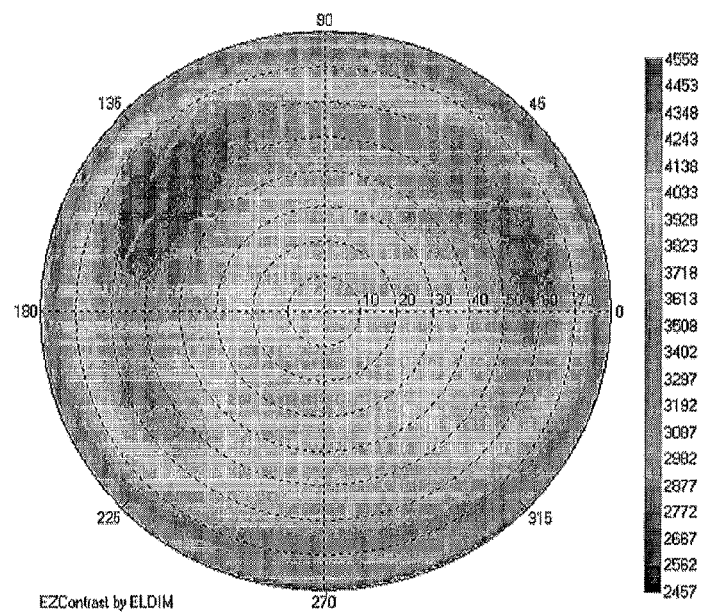
FIG. 9 depicts ELDIM pattern of the light passing through the light diffusion structure.

FIG. 8 is a SEM diagram for a light diffusion structure formed on a PC film of 500 μm. FIG. 9 depicts ELDIM pattern. High light intensity can be observed exceeding the view angle 45°. When light enters the film, it has a refraction angle of over 45°, which exceeds the critical angle 38.97° for PC material, whereby the light propagates in the film by continuous total reflection.

Figure 10:
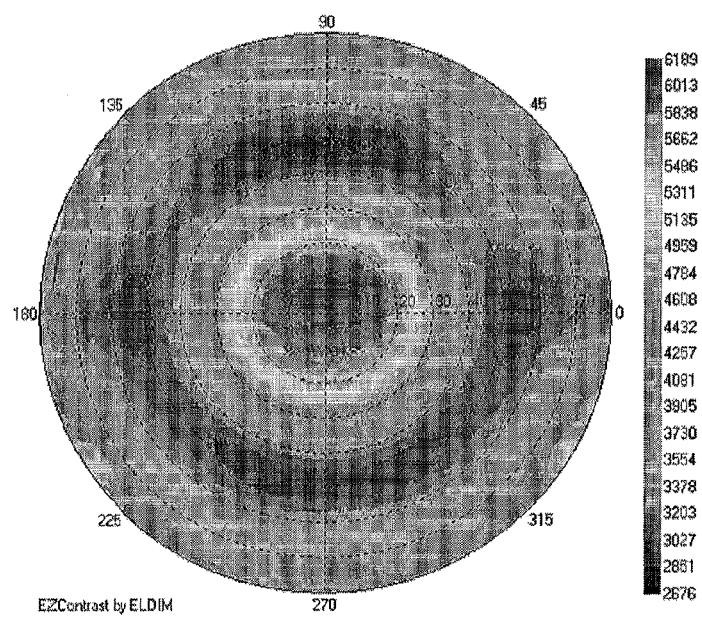
FIG. 10 depicts another ELDIM pattern of the light passing through the light diffusion structure.
Figure 11:
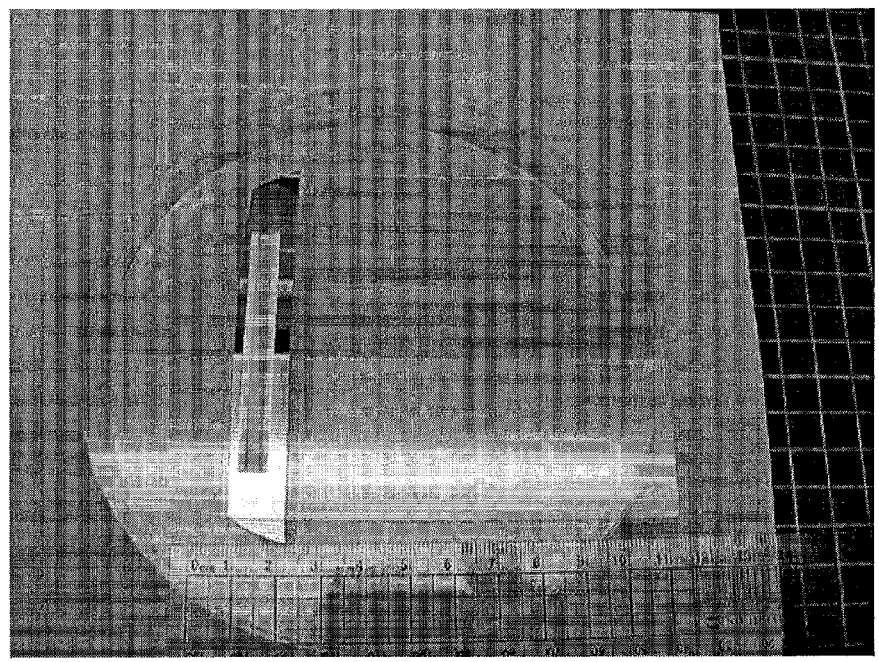
FIG. 11 depicts the light diffusion structure formed on a PC film by heat pressing method.
Figure 12:
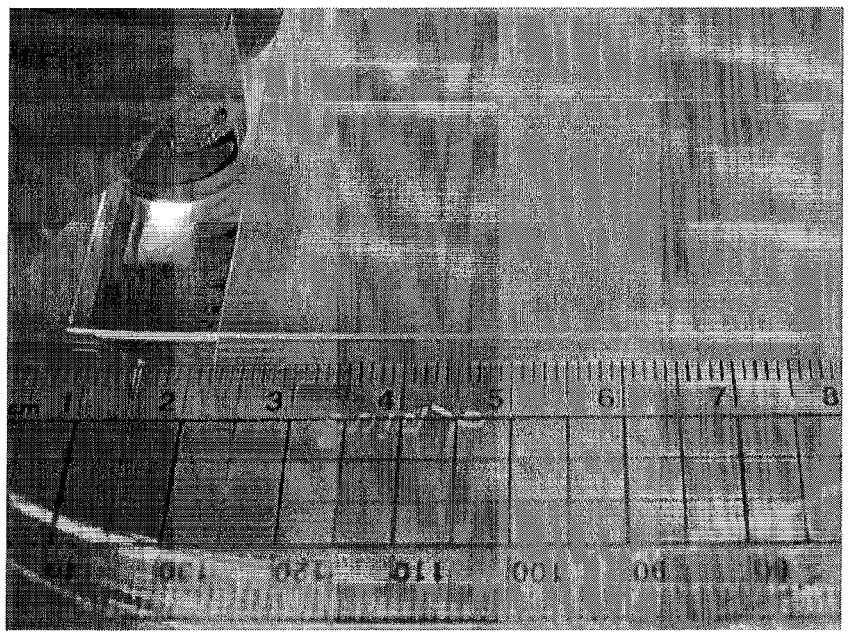
FIG. 12 depicts a laser source disposed in a light inlet region.
Figure 13:
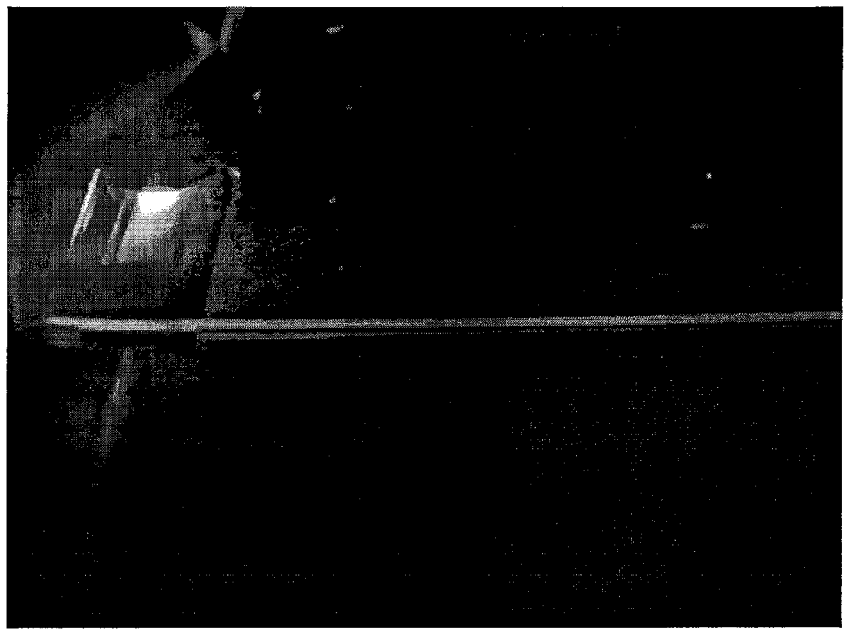
FIG. 13 is a dark view of FIG. 11.
Figure 14:
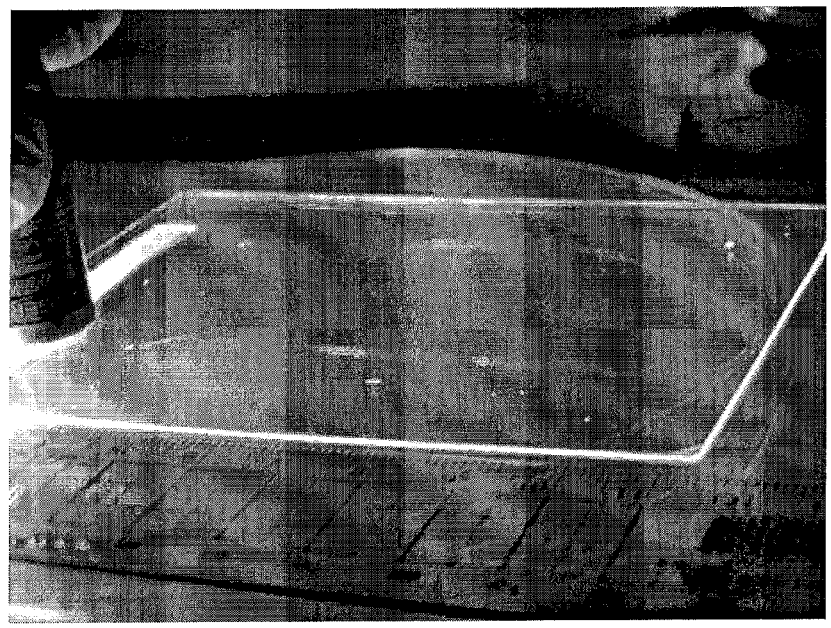
FIG. 14 depicts a white LED emitting light as a light source for the light diffusion structure of FIG. 11.
Figure 15:
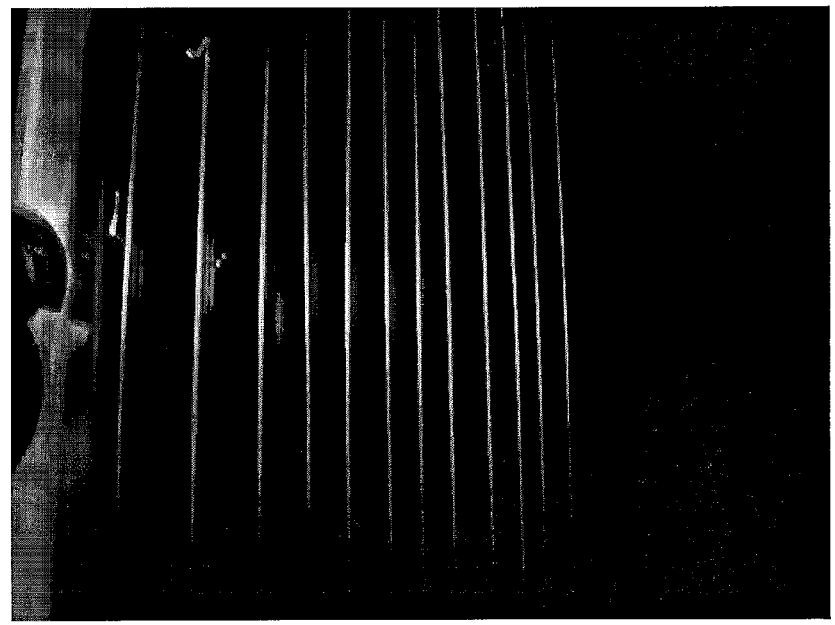
FIG. 15 depicts a light outgoing structure and a red laser as a light source for the light outgoing structure.
Figure 16:
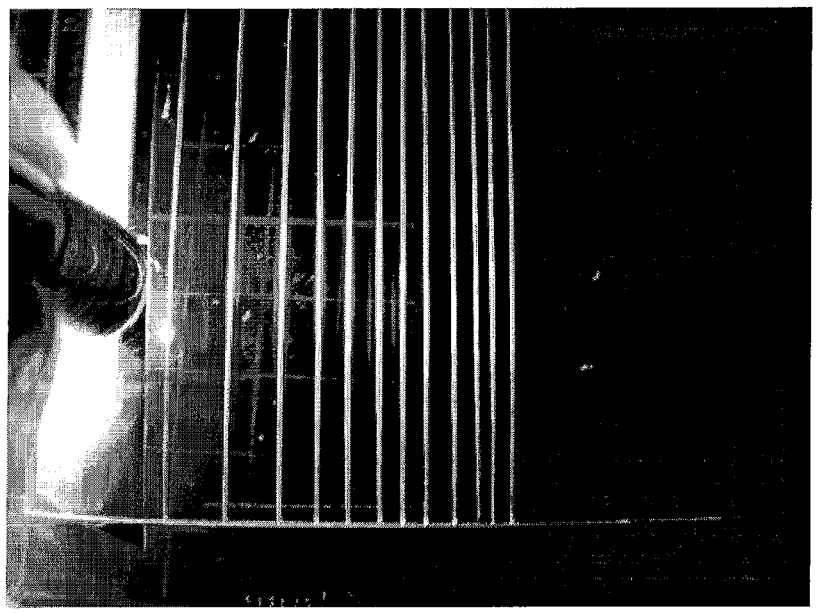
FIG. 16 depicts a white LED as a light source for the light outgoing structure of FIG. 15.
Figure 17:
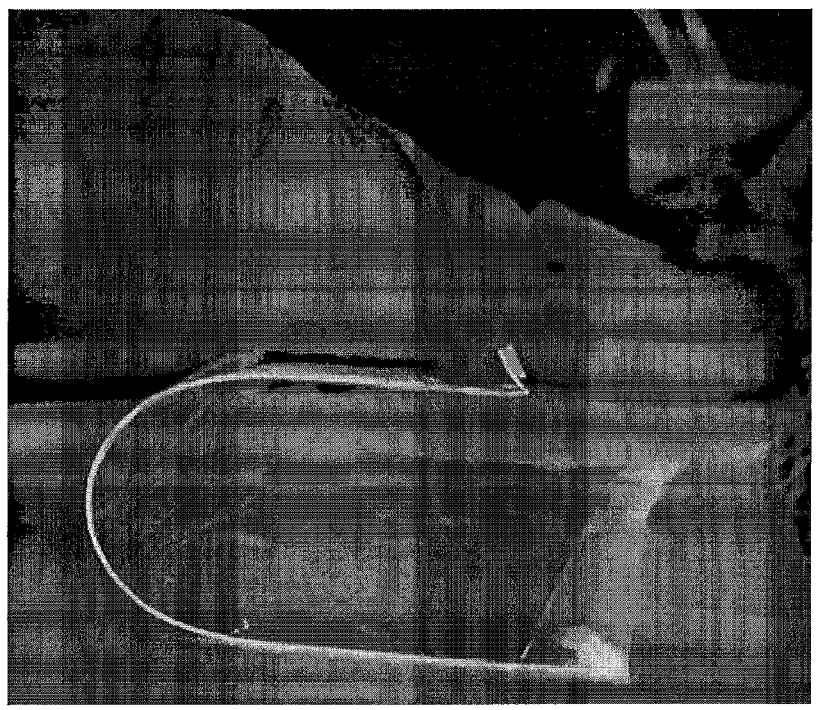
FIG. 17 depicts a bended light guiding film of the invention.
Figure 18:
FIG. 18 depicts a light guiding film with a carved symbols thereon.

FIG. 10 depicts light entering the film in another surface, whereby light is condensed. FIG. 11 depicts the light diffusion structure formed on the film by heat-pressing method. An impression head is used to press the film. A reflective sheet is disposed opposite to the light diffusion structure. FIG. 12 depicts a laser source being used, with the laser exiting the film from the edges. FIG. 13 shows light exiting from the edge of the film, showing light having total reflection in the film. FIG. 14 depicts a white LED being used from the structure of FIG. 13. FIG. 15 depicts a PC film with a light outgoing structure (scratches). Light exits the film from the scratches. FIG. 16 depicts a white LED being used for the structure of FIG. 15. FIG. 17 depicts a bended light guiding film (light can propagates in the bended film). FIG. 18 depicts a light guiding film with scarred symbols from which light exits the film.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light guiding film, comprising:
a main body having a first surface and a second surface opposite thereto, arranged such that light from a light source first enters into the main body via the first surface, and light is emitted to a viewer from the second surface, wherein the light source and the viewer are on opposite sides of the main body; and
a light diffusion structure formed on the first or second surface and comprising a plurality of micro concave lenses arranged in a first direction and a second direction to form a second dimensional array and the curvature of each concave lens and the junction of the concave lenses are different from zero, arranged such that light from the light source coming from outside the main body to inside the main body by passing through the light diffusion structure is refracted into the main body and then propagates in the main body by total reflection.

2. The light guiding film as claimed in claim 1 further comprising a reflective element adjacent to the second surface.

3. The light guiding film as claimed in claim 2, wherein the light diffusion structure is formed on the second surface, arranged such that the light first passes through the first surface to enter the main body, then passes through the light diffusion structure to the reflective element, is reflected back through the light diffusion structure into the main body, and when the light passes back through the light diffusion structure to enter the main body, the light is refracted into the main body by the light diffusion structure and propagates in the main body by total reflection.

4. The light guiding film as claimed in claim 2, wherein the light diffusion structure is formed on the first surface.

5. The light guiding film as claimed in claim 1, wherein the light from the light source is perpendicular or inclined to the light guiding film.

6. The light guiding film as claimed in claim 1, wherein the first direction is substantially perpendicular to the second direction.

7. The light guiding film as claimed in claim 1, wherein the ratio of the width to the depth of each micro concave lens is larger than 2.

8. The light guiding film as claimed in claim 1, wherein the aspect ratio of each micro concave lens is larger than 1.

9. The light guiding film as claimed in claim 1 further comprising a light outgoing structure formed on the second surface, wherein the light propagating in the main body exits the main body via the light outgoing structure.

10. The light guiding film as claimed in claim 1, wherein the incident direction of the light is substantially perpendicular to the propagating direction of the light.

11. The light guiding film as claimed in claim 1, wherein the material of the light guiding film is transparent and comprises polycarbonate, PET, COP, COC, PE, PP, PES, PI, PMMA or PS.

12. The light guiding film as claimed in claim 1, wherein the light diffusion structure is formed on the main body by an impression head with a heat pressing method.

13. The light guiding film as claimed in claim 1, wherein the light diffusion structure is formed on the main body by a mold injection method.

14. The light guiding film as claimed in claim 1, wherein the light diffusion structure is formed on the main body by an UV molding method.

15. The light guiding film as claimed in claim 14, wherein the UV molding method employs UV adhesive having the same refraction index as the main body.

16. The light guiding film as claimed in claim 1, wherein the light diffusion structure is formed on the first surface.

17. The light guiding film as claimed in claim 1, wherein the light diffusion structure is formed on the second surface.

* * * * *